(12) United States Patent
Aditya (10) Patent No.: US 8,856,875 B2
(45) Date of Patent: Oct. 7, 2014

(54) SOFTWARE DELIVERY MODELS

(75) Inventor: Vikas Aditya, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/556,981

(22) Filed: Jul. 24, 2012

(65) Prior Publication Data

US 2013/0031607 A1 Jan. 31, 2013

Related U.S. Application Data

(60) Provisional application No. 61/511,397, filed on Jul. 25, 2011.

(51) Int. Cl.
*G06F 7/00* (2006.01)

(52) U.S. Cl.
USPC ............... 726/3; 726/26; 713/150; 713/164; 713/189; 713/193; 713/175; 380/277; 380/278; 709/224; 709/202

(58) Field of Classification Search
USPC ........ 726/3, 26; 713/150, 164, 189, 193, 175; 380/277, 278; 709/202, 224
See application file for complete search history.

(56) References Cited

U.S. PATENT DOCUMENTS

| | | | | |
|---|---|---|---|---|
| 7,156,299 | B1 * | 1/2007 | Harris et al. | 235/379 |
| 2005/0138400 | A1 * | 6/2005 | Wu et al. | 713/189 |
| 2005/0149733 | A1 * | 7/2005 | Catherman et al. | 713/175 |
| 2007/0016801 | A1 * | 1/2007 | Bade et al. | 713/193 |
| 2007/0038856 | A1 * | 2/2007 | Ali et al. | 713/164 |
| 2007/0183598 | A1 * | 8/2007 | Kim et al. | 380/277 |
| 2008/0007764 | A1 * | 1/2008 | Zhang et al. | 358/1.15 |
| 2008/0034110 | A1 * | 2/2008 | Suganthi et al. | 709/238 |
| 2008/0046371 | A1 * | 2/2008 | He et al. | 705/51 |
| 2008/0211670 | A1 * | 9/2008 | Gordon | 340/572.1 |
| 2009/0031426 | A1 * | 1/2009 | Dal Lago et al. | 726/26 |
| 2009/0044266 | A1 * | 2/2009 | Sharp et al. | 726/14 |
| 2009/0055465 | A1 * | 2/2009 | DePue et al. | 709/202 |
| 2009/0290716 | A1 * | 11/2009 | O'Connor et al. | 380/278 |
| 2010/0011200 | A1 * | 1/2010 | Rosenan | 713/2 |
| 2010/0312851 | A1 * | 12/2010 | Jackson et al. | 709/217 |
| 2011/0035577 | A1 * | 2/2011 | Lin et al. | 713/150 |
| 2012/0173885 | A1 * | 7/2012 | Acar et al. | 713/193 |
| 2012/0246297 | A1 * | 9/2012 | Shanker et al. | 709/224 |

OTHER PUBLICATIONS

IEEE 802.3 Section One—Clause 1 through Clause 20 and Annex H and Annex 4A, 2008 IEEE, 671 pages.

(Continued)

*Primary Examiner* — Beemnet Dada
*Assistant Examiner* — Sayed Beheshti Shirazi
(74) *Attorney, Agent, or Firm* — Grossman, Tucker, Perreault & Pfleger, PLLC (57) ABSTRACT

Generally, this disclosure describes software delivery systems (and methods). A server is provided that operates to provision software on a customer's local machine. The server system, in response to a software purchase from an end user (customer), is configured to install the software on the customer's machine, encrypt the software, and provision encryption keys to grant the customer access to the software. In addition, a software agent is installed on the customer's machine that enables monitoring, by the server, of the customer's installed software. The server system is configured to control customer access to the installed software, via the software agent, and to terminate customer access to the software (for example, for nonpayment of fees). Thus, the software provider can retain control over software that is remotely deployed at an end user location.

18 Claims, 4 Drawing Sheets

(56) References Cited

OTHER PUBLICATIONS

IEEE 802.3 Section Two—Clause 21 through Clause 33 and Annex 22A through Annex 33E, 2008 IEEE, 790 pages.
IEEE 803.2 Section Three—Clause 34 through Clause 43 and Annex 36A through Annex 43C, 2008 IEEE, 315 pages.
IEEE 802.3 Section Four—Clause 44 through Clause 55 and Annex 44A through Annex 55B, 2008 IEEE, 586 pages.
IEEE 802.3 Section Five—Clause 56 through Clause 74 and Annex 57A through Annex 74A, 2008 IEEE, 615 pages.

* cited by examiner

SOFTWARE DELIVERY MODELS

CROSS REFERENCE TO RELATED APPLICATIONS

This application claims the benefit of U.S. Provisional Application No. 61/511,397 filed Jul. 25, 2011, which is incorporated by reference herein in its entirety.

FIELD

This disclosure relates to software delivery models, and more particularly, to software delivery models with secure access control and monitoring.

BACKGROUND

Typically, some software applications are delivered via servers that are hosted in a data center and customers/subscribers of these applications access the applications remotely. This paradigm, sometimes known as Software-as-a-service (SaaS), enables software providers to provide their software on a contract basis (e.g., monthly fee, usage fee, etc.) and also enables the software provider to turn off access to the software service if, for example, a customer cancels a subscription or if a customer stops paying. However, some software applications must, for efficiency reasons, be installed on a customer's local machine. Since such devices are not in control of the software provider, if a customer stops paying for the software, there is little that the software provider can do to recover the software installed on a customer's local machine.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure describes software delivery systems (and methods). A server is provided that operates to provision software on a customer's local machine. The server system, in response to a software purchase from an end user (customer), is configured to install the software on the customer's machine, encrypt the software, and provision encryption keys to grant the customer access to the software. In addition, a software agent is installed on the customer's machine that enables monitoring, by the server, of the customer's installed software. The server system is configured to control customer access to the installed software, via the software agent, and to terminate customer access to the software (for example, for nonpayment of fees). Thus, the software provider can retain control over software that is remotely deployed at an end user location. In some embodiments, a software key and a license key are independently provisioned by the server to prevent stream hacking of a software download, thus providing an additional layer of protection for the software provider. In addition, trusted platforms may be used to store encryption keys to prevent unauthorized access of the encryption keys.

System Architecture

Figure 1:
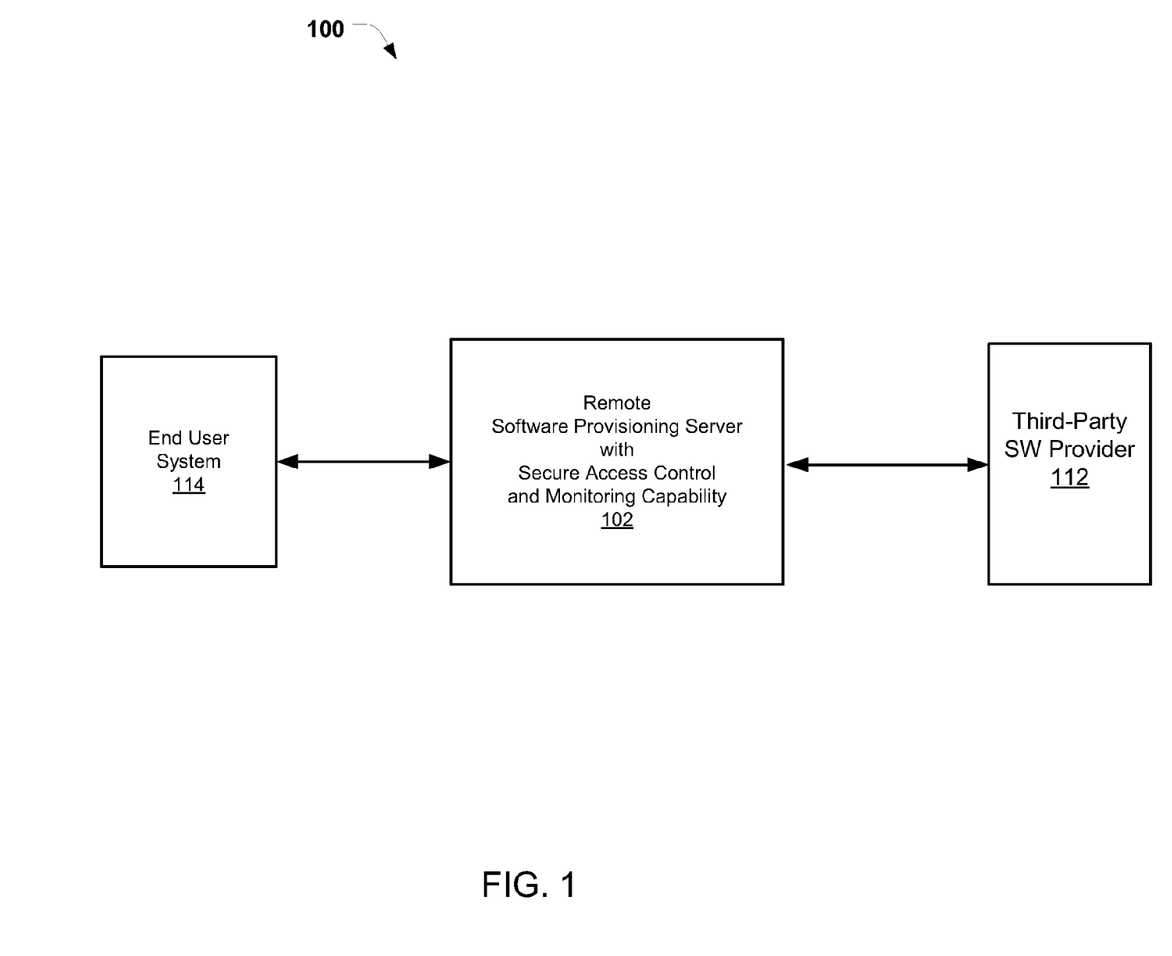
FIG. 1 illustrates a top-level block diagram of one exemplary system embodiment consistent with various embodiments of the present disclosure.

FIG. 1 illustrates a top-level block diagram 100 of one exemplary system embodiment consistent with various embodiments of the present disclosure. System 100 of this embodiment generally includes a remote server system 102, an end user system 114 and a third-party software provider 112. Remote server system 102 may be configured to provide software provisioning with secure access control and monitoring capability, as will be described in greater detail below. In general, the remote server system 102, end user system 114 and third-party software provider 112 are each configured to communicate with each other using, for example, one or more network communication protocols (e.g., internet, TCP/IP, etc.). To that end, the end user system 114, remote server system 102 and third-party software provider 112 may each be implemented using, for example, a Microsoft Windows®-based computer system having an Intel host processor, a network interface card (NIC), a hard disk drive and memory, as well as the necessary operable support circuitry, operating system, software and/or firmware.

Figure 2:
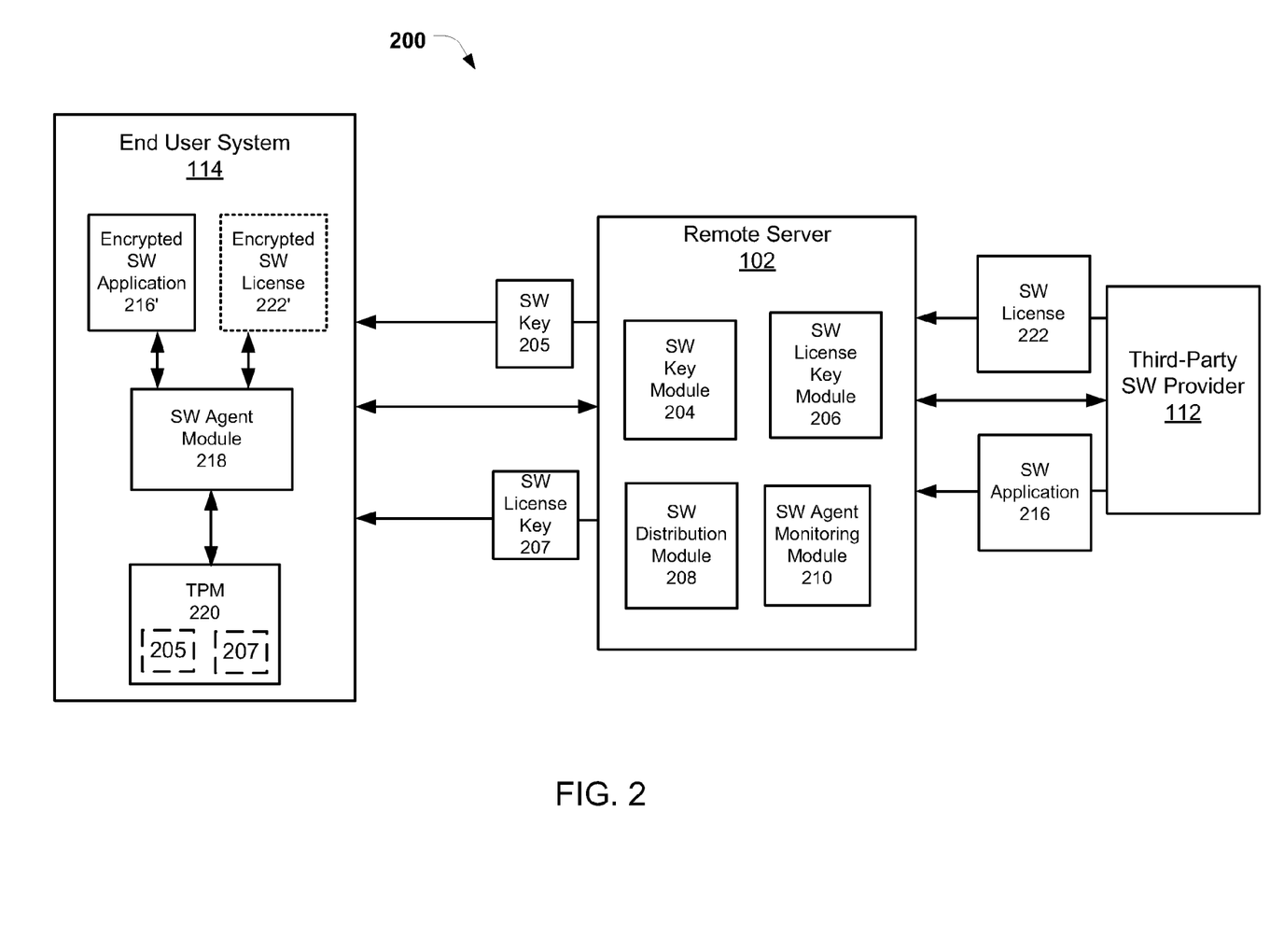
FIG. 2 illustrates one exemplary system embodiment consistent with various embodiments of the present disclosure.

FIG. 2 illustrates one exemplary system embodiment 200 consistent with the present disclosure. Shown in greater detail are remote server system 102, an end user system 114 and a third-party software provider 112.

The remote server system 102 may include a software key module 204 that is configured to generate a software encryption key 205, and a software license key module 206 that is configured to generate a software license encryption key 207. The remote server 102 may also include a software distribution module 208 that is configured to receive a request for at least one software application 216 from the end user system 114, communicate with the third-party software provider 112, and download the software application 216 from the third-party software provider 112 to the end user system 114. In addition, the software distribution module 208 may be configured to encrypt the software application 216 (the encrypted form of the software application 216 is designated herein by the reference 216') using the software key 205. In some embodiments the module 218 is also configured to encrypt a software license 222 (the encrypted form of the software license 222 is designated herein by the reference 222') using the software license key 207. The remote server system 102 may also include a software agent monitoring module 210 that is configured to install a software agent module 218 on the end user system 114 and monitor the installed software application 216 on the end user system 114, as will be described in greater detail below.

The end user system 114 is configured to store at least one encrypted software application 216' (which may be stored, for example, on a system hard disk drive) and a software agent module 218. The software agent module 218 is configured to encrypt/decrypt the software application 216', using the software key 205, when an end user seeks to use the software application 216. In addition, the software agent module 218 is configured to monitor the usage of the software application 216 and communicate with the software agent monitoring module 210 of the remote server 102. In some embodiments, the end user system 114 may include a trusted platform module (TPM) 220 (which may include, for example, a trusted platform processor manufactured by Intel Corp.) that is configured to securely store encryption keys. Thus, in some embodiments, the software key 205 and/or the software license key 207 may be stored in the TPM 220, which is generally inaccessible to the end user. In that case, the software agent module 218 may be configured to communicate with the TPM 220 (via, for example a secure bus) to retrieve the software key 205 and/or the software license key 207. The third-party software provider 112 is generally configured to provide at least one software application 216 available for download to the end user system 114.

In operation, the remote server system 102 is configured to receive a request from the end user system 114 to download at least one software application 216 from the third-party software provider 112. In response to the download request, the software agent monitoring module 210 is configured to control the end user system 114 and download the software agent module 218 to the end user system 114. The software distribution module 208 is configured to encapsulate and encrypt the software application 216 (as may be received from the third-party software provider 112) and to cause the software key module 204 to provision a software encryption key 205 for the software application 216. In addition, in some embodiments, the software distribution module 208 is configured to receive, independently from the software application 216, a software license 222 that corresponds to the application 216, and to cause the software license key module 206 to provision a software license encryption key 207. The software distribution module 208 communicates with the end user system 114 to install an encrypted version of the software application 216' and in some embodiments, installs an encrypted version of the software license 222. In addition, in some embodiments the software distribution module 208 communicates with the end user system 114 to cause the key 205 and/or 207 to be stored on the TPM 220 of the end user system 114.

In order for the end user to use the software application 216, the software agent module 218 decrypts the encrypted application 216' (using key 205) and/or decrypts the license corresponding to the software application 216 (using key 207), and monitors the usage of the software application 216 by the user system 114. Thus, in some embodiments, the software key 205 is used to decrypt the software application 216', and independently, the software license key 207 is used to decrypt the software license 222' that corresponds to the software application 216. Since the application 216 may not be used unless the software itself is decrypted and the license 222 is present and decrypted, an additional layer of software management is provided (as compared to application encryption alone).

Once the software agent module 218, the encrypted application 216' and the appropriate keys 205 and/or 207 are installed on the end user system 114, the software agent monitoring module 210 of the remote server system 102 is configured to communicate with the software agent module 218 to receive relevant information about the state and usage of the software application 216. For example, the software agent monitoring module 210 of the remote server system 102 is configured to communicate with the software agent module 218 to receive information about the number of users accessing the software application 216, the frequency of use of the software application 216, the time in use of the software application, and/or other parameters that may be relevant to the third-party software provider 112 in connection with the sale or lease of the software application 216. In addition, in the event that the end user has failed to abide by the agreed terms of the software license, the software agent monitoring module 210 may be configured to control the software agent monitoring module 218 to disable, in whole or in part, user access to the software application 216. For example, the software agent monitoring module 210 may be configured to control the software agent module 218 to delete or remove the encrypted software application 216' from the end user system 114, and/or delete or remove the keys 205 and/or 207 from the TPM 220.

In addition, the software agent monitoring module 210 may be configured to maintain a link with the software agent module 218, for example, a periodic acknowledgement from the software agent module 218 concerning the state of the software application 216 and/or the end user system 114. In the event that the link between the software agent monitoring module 210 and the software agent module 218 is broken (or otherwise "timed out"), the software agent module 210 may be configured to terminate user access of the software application 216 (for example, using the deletion mechanisms described above). Additionally, in some embodiments, the software agent module 218 may be configured to receive a signal from the TPM 220 concerning unauthorized attempts (e.g., hacks) to access one or more keys (205 and/or 207) stored therein. If such an unauthorized attempt is discovered, the software agent module 218 may be configured to report these facts to the software agent monitoring module 210 and/or disable access to the software application 216'.

It should be noted that the term "module," as used herein, may be embodied as software (which may include, for example, instructions or code), hardware (e.g. circuitry, etc.) and/or firmware that is configured to perform the operations stated herein. In addition, "circuitry" or "circuit", as used herein, may comprise, for example, singly or in any combination, hardwired circuitry, programmable circuitry, state machine circuitry, and/or circuitry available in a larger system, for example, discrete elements that may be included as part of an integrated circuit chip.

Exemplary Methodology

Figure 3:
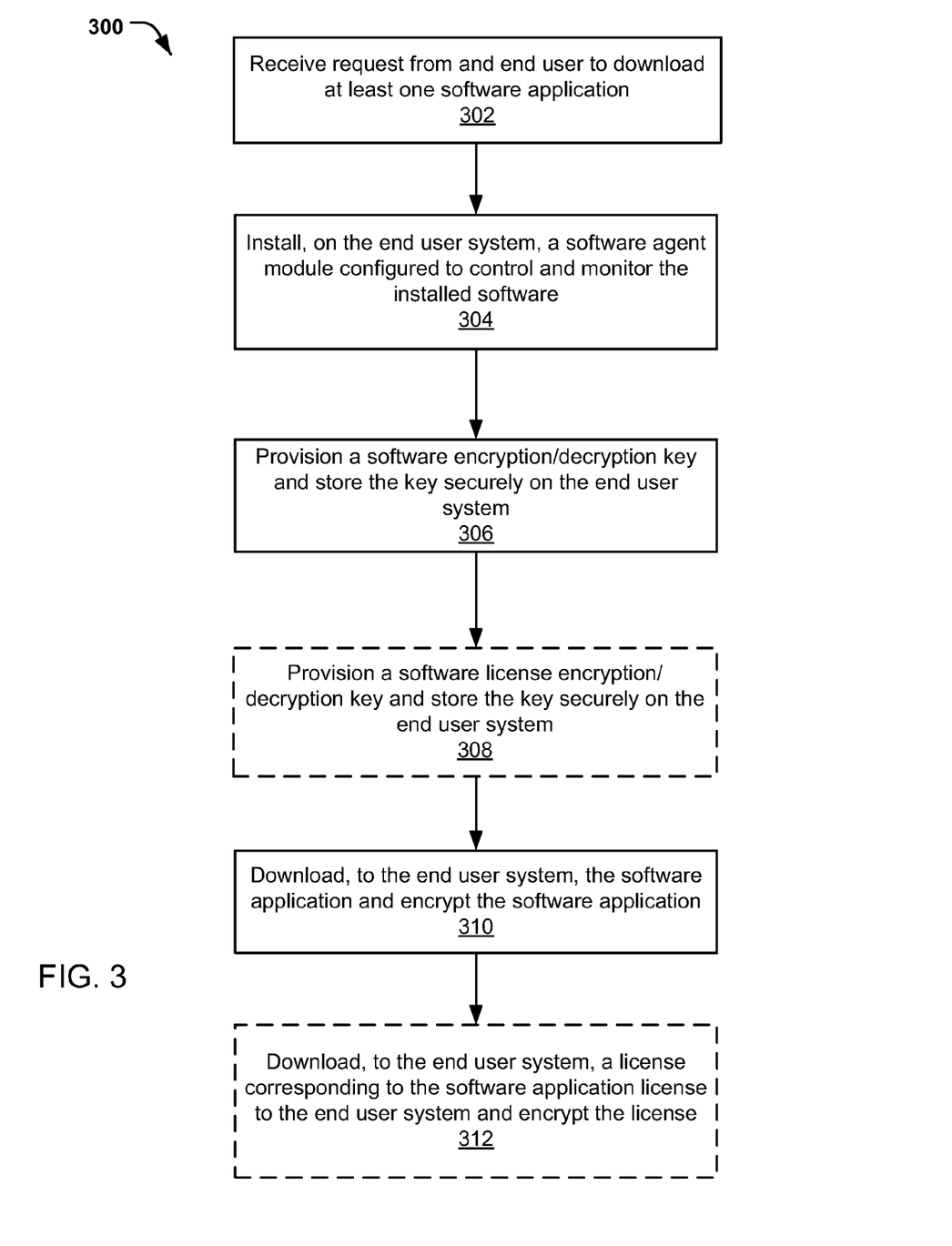
FIG. 3 illustrates a flowchart of exemplary operations consistent with one embodiment of the present disclosure.

FIG. 3 illustrates a flowchart 300 of exemplary operations consistent with one embodiment of the present disclosure. In particular, the flowchart of FIG. 3 depicts exemplary operations of initializing a user system, from a remote server system, and installing various protection mechanisms to protect and control third-party software downloaded on the user system. Operations of this embodiment include receiving a request from an end user to download at least one software application 302. Here, the software application may be provided directly or indirectly from a third-party software provider. In response to the request from a user, operations include installing, on the end user system, a software agent module that is configured to control and monitor the software application 304. The software agent module may be configured to control user access to the software application, such that, if the software agent module is removed or otherwise unavailable, the software application will not run on the end user system. To provide encryption of the software application, operations of this embodiment may also include provisioning a software encryption/decryption key and storing the software key on the end user system 306. To prevent the end user from accessing the encryption/decryption key, the key may be stored in a secure location of the end user system, e.g., using a trusted platform module or other security circuitry/system that "hides" the key from the user. To provide an additional layer of independent protection of the installed software application, operations according to some embodiments include provisioning a software license encryption/decryption key and storing the software license key on the end user system 308. Similar to the software key, the software license key may be stored in a secure location of the end user system.

Operations according to this embodiment may also include downloading, to the end user system, the software application and encrypting the software application 310. The process of downloading the software application may also include installing the application on the end user system (e.g., conforming to the particular environment of the end user system) and performing any necessary updates/fixes/patches to the software application that may be necessary for proper operation. If a software license is separately and independently encrypted, operations may also include downloading, to the end user system, the software license to the end user system and encrypting the license using the license key 312.

Once the software agent module, software application (encrypted) and the software key and/or the software license key are installed on the end user system, use of the software application is controlled via the software agent module. For example, when a user attempts to launch the software application, the software agent module is configured to communicate with the remote server to determine if the user is allowed access to the software application, and if so, the software agent module is configured to decrypt the software application and/or the software license using the software key and/or the software license key, respectively, and allow the user to access the software application. In addition, the software agent module is configured to periodically communicate with the remote server. If the communications link between the software agent module and the remote server is not present, the software agent module is configured to deny the user access to the software application.

Figure 4:
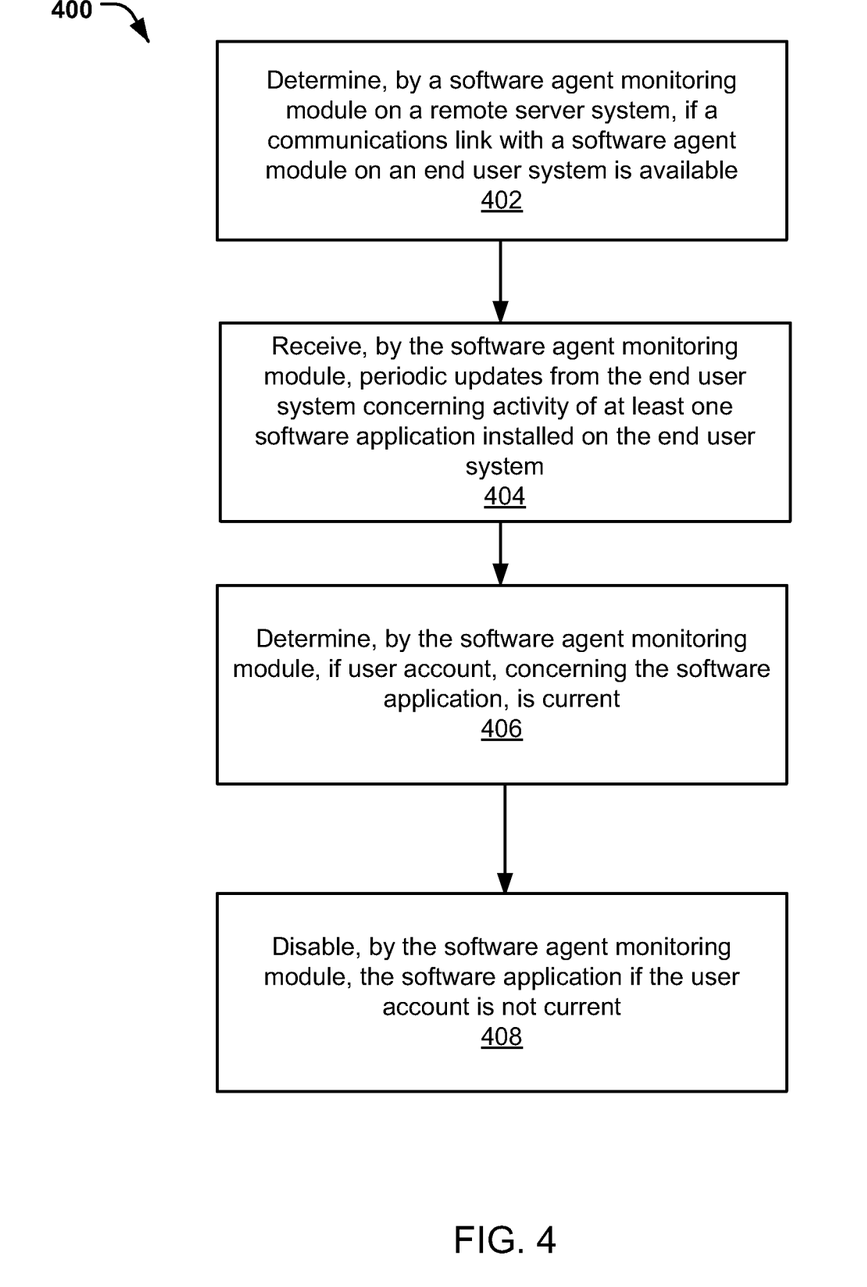
FIG. 4 illustrate a flowchart of exemplary operations consistent with another embodiment of the present disclosure.

FIG. 4 illustrate a flowchart 400 of exemplary operations consistent with another embodiment of the present disclosure. In particular, the flowchart of FIG. 4 depicts exemplary operations of remote software monitoring and control. Operations of this embodiment include determining, by a software agent monitoring module on a remote server system, if a communications link with a software agent module on an end user system is available 402. Operations according to this embodiment also include receiving, by the software agent monitoring module, periodic updates from the end user system concerning activity of at least one software application installed on the end user system 404. Operations may also include determining, by the software agent monitoring module, if a user account concerning the software application is current 406. Operations may also include disabling, by the software agent monitoring module, the software application if the user account is not current 408.

While FIGS. 3 and 4 illustrate various operations according to some embodiments, it is to be understood that not all of these operations depicted in FIGS. 3 and/or 4 are necessary for any embodiment. Indeed, it is fully contemplated herein that in other embodiments of the present disclosure, the operations depicted in FIGS. 3 and/or 4 may be combined in a manner not specifically shown in any of the drawings, but still fully consistent with the present disclosure. Thus, claims directed to features and/or operations that are not exactly shown in one drawing are deemed within the scope and content of the present disclosure.

Embodiments of the methods described herein may be implemented in a system that includes one or more storage mediums having stored thereon, individually or in combination, instructions that when executed by one or more processors perform the methods. Here, the processor may include, for example, a system CPU and/or other programmable circuitry. Thus, it is intended that operations according to the methods described herein may be distributed across a plurality of physical devices, such as processing structures at several different physical locations. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

The communications protocol, described herein, may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard.

Modifications to the present disclosure may be made. For example, the server system 102 may be configured to update the software application 216 (deployed on the end user system 114) with patch code, bug fixes, version upgrades, etc. In addition, the server system may include a front end module (not shown) that permits a user to access the server system, for example, to request downloading of software. Such front end modules may be implemented as a web page (HTML), etc., and may also be configured to provide contract license terms and conditions (e.g., monthly fee, per user fee, usage fee, etc.) for the software application 216. In addition, while the remote server 102 and third-party software provider 112 are depicted in FIG. 1 as separate entities, in other embodiments these two components may be the same entity. Further, while the examples described above are in reference to a single software application 216, it should be understood that the server system 102 may be configured to "package" two or more separate software applications as a unit for downloading to the end user system 114.

Thus the present disclosure provides methods and systems for software delivery models with secure access control and monitoring. According to one aspect there is provided a method. The method may include receiving a request, at a remote server from an end user system, to download at least one software application to the end user system. The method of this example may also include installing, on the end user system by the remote server, a software agent module configured to control user access to the at least one software application and configured to monitor the usage of the at least one software application. The method of this example may further include provisioning, by the remote server, a software encryption key and controlling the end user system to store the software encryption key on the end user system. The method of this example may further include downloading, by the remote server to the end user system, the software application and encrypting the software application using the software encryption key.

Another example method includes the forgoing operations and further includes configuring the software agent module to, in response to a user command to run the at least one software application, decrypt the at least one software application using the software encryption key.

Another example method includes the forgoing operations and further includes provisioning, by the remote server, a software license encryption key and controlling the end user system to store the software license encryption key on the end user system; and downloading, by the remote server to the end user system, a software license corresponding to the at least one software application and encrypting the software license using the software license encryption key.

Another example method includes the forgoing operations and further includes configuring the software agent module to, in response to a user command to run the at least one software application, decrypt the software license using the software license encryption key.

Another example method includes the forgoing operations and further includes configuring the software agent module to communicate with the remote server system to provide information related to user access of the at least one software application on the end user system.

Another example method includes the forgoing operations and further includes determining, by the remote server system, if the user of the at least one software application on the end user system is abiding by user account terms.

Another example method includes the forgoing operations and further includes disabling, by the remote server system, user access to the at least one software application if the user account terms have been violated.

Another example method includes the forgoing operations and further includes configuring the software agent module to communicate with the remote server system, and further configuring the software agent module to deny the user access to the at least one software application if the software agent module is unable to communicate with the remote server.

According to another aspect there is provided a system. The system may include a server system configured to communicate with an end user system. The server system of this example may also be configured to receive a request, from the end user system, to download at least one software application to the end user system. The server system of this example may further be configured to install, on the end user system, a software agent module configured to control user access to the at least one software application and configured to monitor the usage of the at least one software application. The server system of this example may further be configured to provision a software encryption key and control the end user system to store the software encryption key on the end user system. The server system of this example may further be configured to download, to the end user system, the software application and encrypt the software application using the software encryption key.

Another example system includes the forgoing components and the server system is further configured to configure the software agent module to, in response to a user command to run the at least one software application, decrypt the at least one software application using the software encryption key.

Another example system includes the forgoing components and the server system is further configured to provision a software license encryption key and control the end user system to store the software license encryption key on the end user system; and download, to the end user system, a software license corresponding to the at least one software application and encrypt the software license using the software license encryption key.

Another example system includes the forgoing components and the server system is further configured to configure the software agent module to, in response to a user command to run the at least one software application, decrypt the software license using the software license encryption key.

Another example system includes the forgoing components and the server system is further configured to configure the software agent module to communicate with the server system to provide information related to user access of the at least one software application on the end user system.

Another example system includes the forgoing components and the server system is further configured to determine if the user of the at least one software application on the end user system is abiding by user account terms.

Another example system includes the forgoing components and the server system is further configured to disable user access to the at least one software application if the user account terms have been violated.

Another example system includes the forgoing components and the server system is further configured to configure the software agent module to communicate with the remote server system, and further configure the software agent module to deny the user access to the at least one software application if the software agent module is unable to communicate with the server system.

According to another aspect there is provided at least one computer-readable storage medium having instructions stored thereon which when executed by a processor, cause the processor to perform the steps of the method as described in the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method, comprising:
   receiving a request, at a server from an end user system, to download at least one software application from a third party software provider to the end user system;
   transmitting a software agent module from the server to the end user system, the software agent module configured to control user access to the at least one software application and configured to monitor the usage of the at least one software application;
   transmitting a software encryption key from the server to be stored in a trusted platform module (TPM) of the end user system;
   transmitting a software license encryption key from the server to be stored in the TPM on the end user system;
   transmitting an encrypted software license corresponding to the at least one software application to be installed at the end user system, the encrypted software license encrypted using the software license encryption key;
   transmitting, from the server to the end user system, the software application encrypted using the software encryption key to be installed at the end user system; and
   receiving, at the server, information from the software agent module related to a state and user access of the at least one software application on the end user system.

2. The method of claim 1, further comprising:
   in response to a user command to run the at least one software application, decrypting, via the software agent module, the at least one software application using the software encryption key stored in the TPM.

3. The method of claim 1, further comprising:
   in response to a user command to run the at least one software application, decrypting, via the software agent module, the software license using the software license encryption key stored in the TPM.

4. The method of claim 1, further comprising:
determining, by the server, when the user of the at least one software application on the end user system is abiding by user account terms.

5. The method of claim 4, further comprising:
disabling, by the server, user access to the at least one software application when the user account terms have been violated.

6. The method of claim 1, further comprising:
denying the user access to the at least one software application when the software agent module is unable to communicate with the server.

7. A software distribution system, comprising:
a server, comprising one or more hardware processors, configured to communicate with an end user system; the server further configured to:
receive a request, from the end user system, to download at least one software application from a third party software provider to the end user system;
transmit a software agent module from the server to the end user system, the software agent module configured to control user access to the at least one software application and configured to monitor the usage of the at least one software application;
transmit a software encryption key to be stored in a trusted platform module (TPM) of the end user system;
transmit a software license encryption key from the server to be stored in the TPM on the end user system;
transmit an encrypted software license corresponding to the at least one software application to be installed at the end user system, the encrypted software license encrypted using the software license encryption key;
transmit, to the end user system, the software application encrypted using the software encryption key to be installed at the end user system; and
receiving, at the server, information from the software agent module related to a state and user access of the at least one software application on the end user system.

8. The software distribution system of claim 7, further comprising the end user system, wherein the software agent module of the end user system is further configured to:
in response to a user command to run the at least one software application, decrypt the at least one encrypted software application using the software encryption key.

9. The software distribution system of claim 7, further comprising the end user system, wherein the software agent module of the end user system is configured to:
in response to a user command to run the at least one software application, decrypt the encrypted software license using the software license encryption key.

10. The software distribution system of claim 7, wherein the server is further configured to:
determine when the user of the at least one software application on the end user system is abiding by user account terms.

11. The software distribution system of claim 10, wherein the server is further configured to:
disable user access to the at least one software application when the user account terms have been violated.

12. The software distribution system of claim 7, further comprising the end user system, wherein the software agent module on the server system is configured to:
deny the user access to the at least one software application when the software agent module is unable to communicate with the server.

13. A non-transitory computer-readable storage medium having instructions stored thereon which when executed by a processor result in the following operations comprising:
receiving a request, at a server from an end user system, to download at least one software application from a third party software provider to the end user system;
transmitting a software agent module from the server to the end user system, the software agent module configured to control user access to the at least one software application and configured to monitor the usage of the at least one software application;
transmitting a software encryption key from the server to be stored in a trusted platform module (TPM) of the end user system;
transmitting a software license encryption key from the server to be stored in the TPM on the end user system;
transmitting an encrypted software license corresponding to the at least one software application to be installed at the end user system, the encrypted software license encrypted using the software license encryption key;
transmitting, from the server to the end user system, the software application encrypted using the software encryption key to be installed at the end user system; and
receiving, at the server, information from the software agent module related to a state and user access of the at least one software application on the end user system.

14. The non-transitory computer-readable storage medium of claim 13, further comprising the operations of:
in response to a user command to run the at least one software application, decrypting, via the software agent module, the at least one software application using the software encryption key stored in the TPM.

15. The non-transitory computer-readable storage medium of claim 13, further comprising the operations of:
in response to a user command to run the at least one software application, decrypting, via the software agent module, the software license using the software license encryption key stored in the TPM.

16. The non-transitory computer-readable storage medium of claim 13, further comprising the operations of:
determining, by the server, when the user of the at least one software application on the end user system is abiding by user account terms.

17. The non-transitory computer-readable storage medium of claim 16, further comprising the operations of:
disabling, by the server, user access to the at least one software application when the user account terms have been violated.

18. The non-transitory computer-readable storage medium of claim 13, further comprising the operations of:
denying the user access to the at least one software application when the software agent module is unable to communicate with the server.

* * * * *